United States Patent [19]

Leedom

[11] 3,873,098

[45] Mar. 25, 1975

[54] ROTARY STYLUS RESHAPER

[75] Inventor: Marvin Allan Leedom, Princeton, N.J.

[73] Assignee: RCA Corporation, New York, N.Y.

[22] Filed: Jan. 30, 1974

[21] Appl. No.: 437,966

[52] U.S. Cl. .................................................. 274/1 R
[51] Int. Cl. .......................... G11b 3/56, G11b 3/58
[58] Field of Search ...................................... 214/1 R

[56] References Cited

UNITED STATES PATENTS

| | | | |
|---|---|---|---|
| 727,613 | 5/1903 | Gleason | 274/1 R |
| 1,569,402 | 1/1926 | Slye | 274/1 R |

*Primary Examiner*—Richard E. Aegerter
*Assistant Examiner*—John W. Shepperd
*Attorney, Agent, or Firm*—Eugene M. Whitacre; William H. Meagher

[57] ABSTRACT

In a playback system employing a stylus to recover recorded signals from a video disc when relative motion between the disc and the stylus is established, a rotary stylus reshaper is provided. A freely pivoted, light stylus-arm, carry the stylus, is mounted in a housing employed for movement of the stylus between a rest position and a play position. A rotatable drum, having an axle of rotation perpendicular to the longitudinal axis of the stylus-arm, is located under the stylus when the stylus is at the rest position. The drum has a plurality of circular and coaxial grooves, concentric with the drum, the grooves having walls of abrasive material dimensioned and configured for the purpose of reshaping worn stylus to a desired shape. A friction wheel, mounted on the axle carrying the drum, engages the turntable and causes rotation of the drum when the stylus is lowered into an abrasive groove, permitting reshaping of the stylus. Means, which may be manually or automatically actuated, are provided for lowering and raising of the stylus into and out of engagement with an abrasive groove on the drum when the stylus is at the rest position. A cleaning brush having its bristles in contact with the drum is secured to the board for the purpose of cleaning the drum.

7 Claims, 10 Drawing Figures

ROTARY STYLUS RESHAPER

BACKGROUND OF THE INVENTION

This invention pertains to a rotary stylus shaper compatible with the requirements of a video disc system.

In video disc systems of a variable capacitance type as described in detail in the copending U.S. Pat. Application, Ser. No. 126,772, filed Mar. 22, 1971, now U.S. Pat. 3,842,194, for J. K. Clemens, entitled "Information Records And Recording/Playback Systems Therefor," video information is recorded by means of geometric variations in the bottom of a smooth spiral groove on the surface of a disc. The disc surface includes a layer of conductive material which is preferably covered with a thin coating of dielectric material. A stylus engages the spiral disc groove and includes a conductive surface which, together with the conductive material and the dielectric coating of the disc, form a capacitor. When the disc is rotated, an edge of the conductive surface of the stylus, while riding in the disc groove, serves as an electrode of a capacitor varying due to the geometric variations in the bottom of the spiral groove passing beneath. The capacitive variations, which represent recorded video information (such as the NTSC format), are converted to electrical signal variations which are suitably processed and applied to a conventional television receiver for reproduction.

The stylus including the conductive surface is attached to the free end of a stylus-arm. The stylus-arm is freely pivoted at its other end on a support member attached to a stylus-arm carrying mechanism. The stylus-arm carrying mechanism desirably incorporates a suitable feed drive system for primarily performing the following functions in a predetermined time sequence: (a) movement of the stylus from a rest position to a play position; (b) movement of the stylus transversely across the disc in proper time relationship with the rotational speed of the disc during play and (c) a return movement of the stylus from a play position to a rest position.

For accurate reproduction of prerecorded signals in video disc systems of the aforementioned Clemens type, it is desirable to have malting surfaces of the stylus tip and the disc groove bottom remain in engagement during playback in spite of manufacturing variations in the geometry of the disc groove. If the malting surfaces of the stylus tip and the groove bottom are sufficiently correlated, the desired engagement may be obtained, providing the stylus is sufficiently narrow relative to the narrowest groove width to be encountered. The wear of the stylus, during its normal use, however, may alter the stylus tip dimensions, changing the geometry of the stylus-disc capacitor, and thereby affecting the quality of the recovered signals. In particular, a result of wear may be that the stylus width (the dimension of the stylus transverse to the groove at the point of engagement) increases, thereby (1) lifting the stylus tip out of groove bottom engagement in a relatively narrow groove, and (2) increasing the extent of cross-talk between signals in adjacent groove convolutions (the spacing of adjacent convolutions being close in view of the high groove densities, e.g., 4,000 grooves per inch requisite in practical video disc systems).

In video disc systems of the aforementioned Clemens type, it is further desirable to maintain the relative motion between the disc and the stylus at a predetermined speed (e.g., 450 rpm) to obtain accurate reproduction of the recorded information. Although precise design and manufacture of the disc and playback apparatus minimize the speed errors, random cyclical errors sufficient to noticably affect the picture quality (e.g., by causing jitter) will remain. Cyclical speed errors emanate from several sources: for example, disc and turntable eccentricities, and disc manufacturing defects, to name a few. Errors caused by the aforementioned sources appear at the stylus once or more each revolution. By way of example, speed errors caused by the disc mounting eccentricity will occur at a frequency of 7.5 Hz (at disc rotational speed of 450 rpm). Speed errors caused by two disc manufacturing defects per groove (e.g., two scratches) will repeat at a frequency of 15 Hz (at a disc rotational speed of 450 rpm), and so on. In U.S. Pat. No. 3,711,641, issued to R. C. Palmer on Jan. 16, 1973, entitled "Velocity Adjusting System," a system is disclosed for compensating cyclical speed errors by varying the position of the stylus in the disc groove in a direction tangential to the groove at the point of engagement. This is accomplished by providing a support member for the stylus arm pivot, which is rendered subject to a correcting motion in response to cyclical speed errors. The motion imparted to the support member to the stylus arm pivot is transmitted to the stylus via the stylus-arm at the error frequencies. The cyclical motion of the stylus in the groove at relatively high rates accelerates wear of the stylus at the point of engagement.

In video disc systems, adequate bandwidth for monochrome and color display is obtained by rotating the disc at a speed substantially higher (e.g., 450 rpm) than the conventional audio playback speeds (e.g., 33 and ⅓ rpm). The higher the speed of rotation, the higher is the relative velocity between the disc and the stylus, and therefore, the more rapid the wear of the stylus.

With passage of time, there is a tendency for dust, lint, grit, and other foreign particles to accumulate and harden in the grooves of the disc. During playback, when the stylus is riding in the disc groove, the hard accumulated material hastens wear and deterioration of the stylus.

The present invention proposes, in recognition of the previously described adverse effects of stylus tip wear on video disc player performance, and the above-delineated aspects of player operation that tend to accelerate such wear, the incorporation in the player apparatus of means for on-site reshaping of the stylus tip (with actuation either manually controlled at the option of the user, or automatically controlled to ensure regularity of reshaping, as by reshaping after each arrival at the rest position).

In accordance with an illustrative embodiment of the principles of the present invention, a rotary stylus reshaper is provided. A freely pivoted light stylus-arm (carrying the stylus) is mounted in a housing employed for movement of the stylus between rest and play positions. A rotatable drum having an axis of rotation perpendicular to the longitudinal axis of the stylus arm is located under the stylus when in the rest position. The drum has a plurality of appropriately shaped, abrasive, circular and coaxial grooves, concentric with the drum, for the purpose of reshaping of the stylus to the desired shape. A drive means secured to the board and coupled to the drum is employed for causing rotation of the drum. Means are provided for lowering and raising of the stylus into and out of engagement with an abrasive groove on the drum when the stylus is at rest position.

Pursuant to a further feature of the present invention, a cleaning brush having its bristles in contact with the drum may be secured to the board for the purpose of cleaning the drum.

The objects and advantages of the present invention will be recognized by those skilled in the art upon a reading of the following detailed description and an inspection of the accompanying drawings in which.

Figure 1:
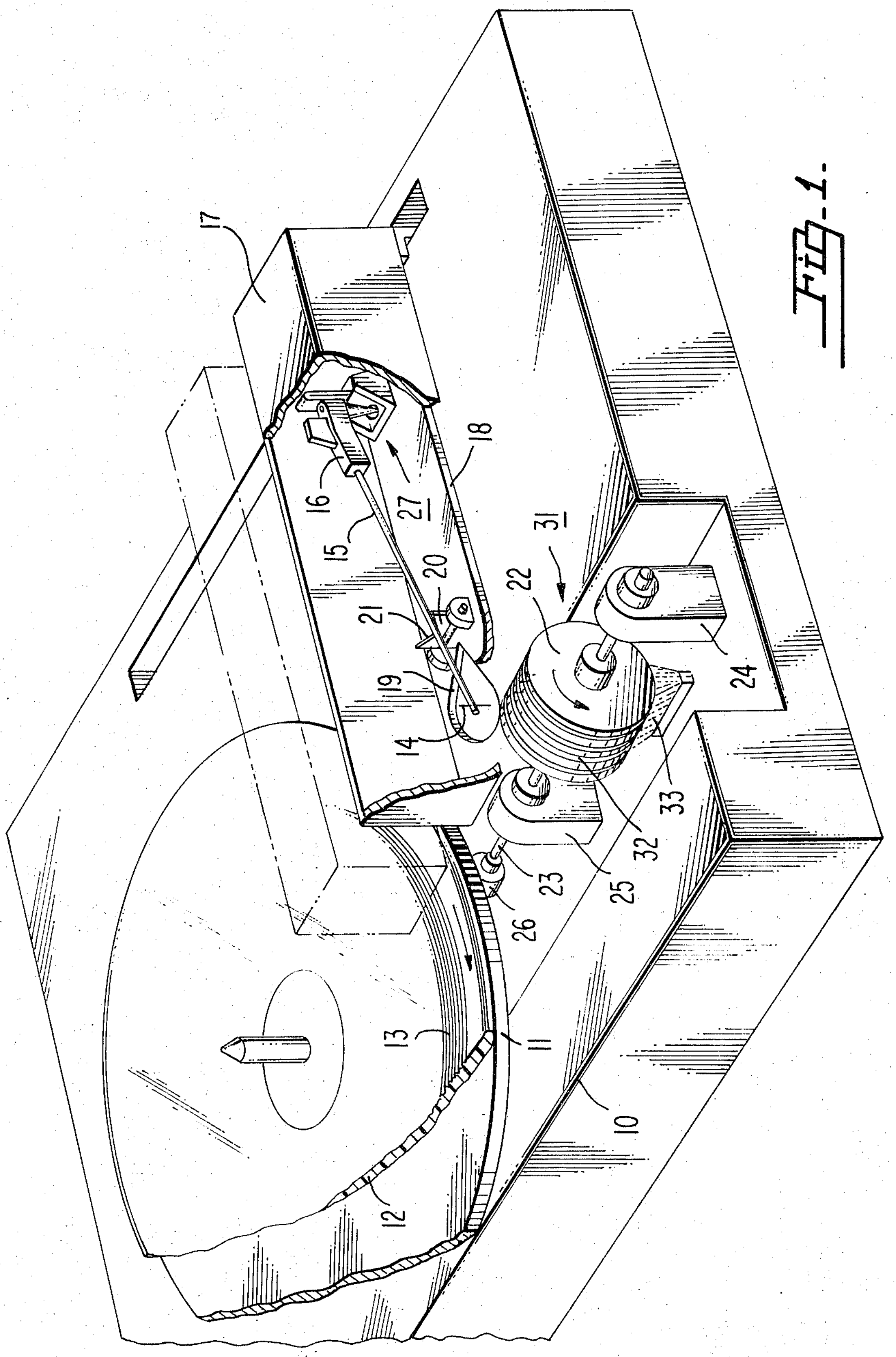
FIG. 1 is a partially cut-away view of a video disc player system incorporating a rotary stylus reshaper in accordance with the principles of the present invention, the stylus being shown in the rest position subject to lowering in an abrasive groove for the purpose of reshaping.
Figures 2, 3:
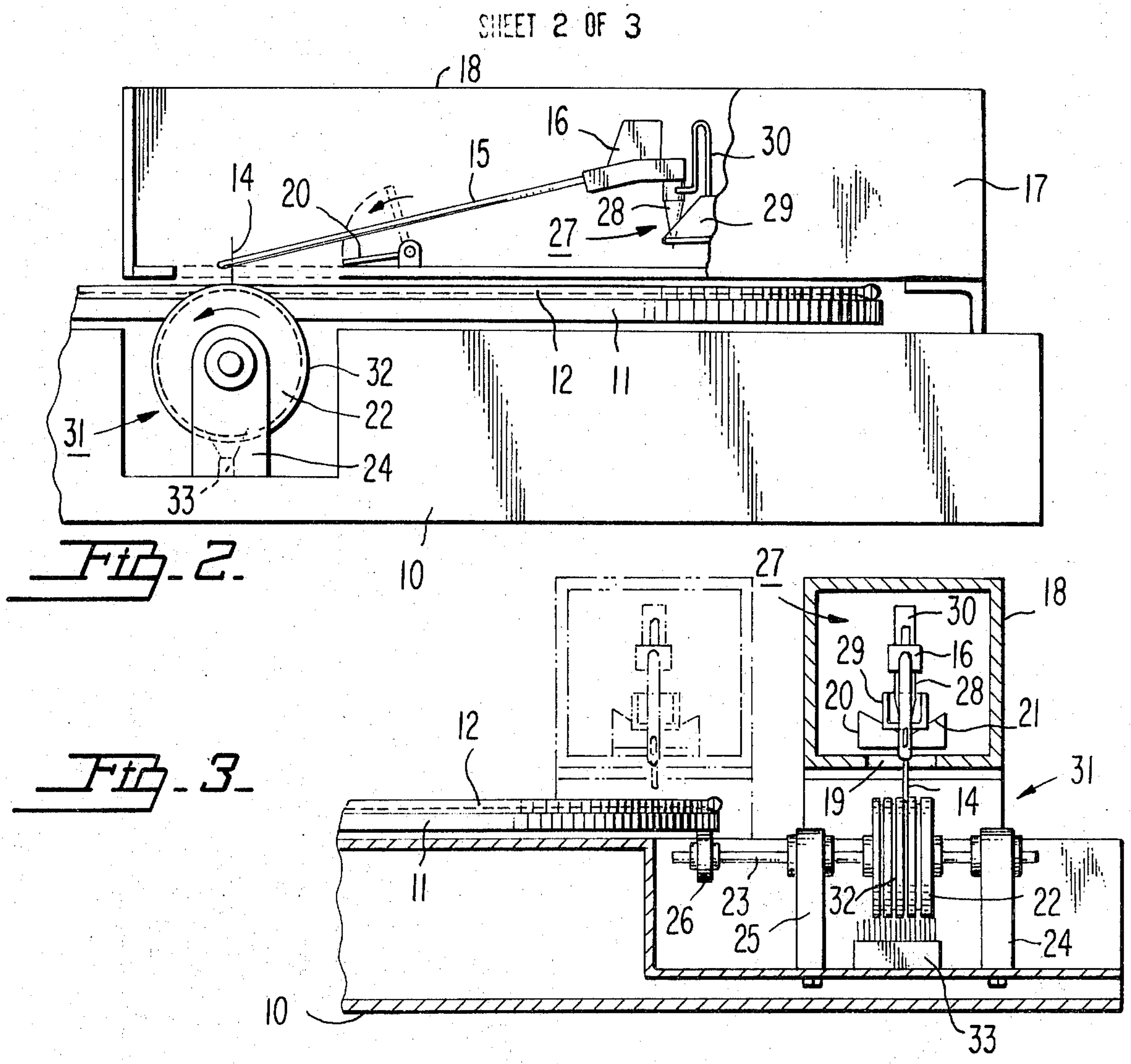
FIGS. 2 and 3 illustrate an end view and an elevation, respectively, of the FIG. 1 apparatus, depicting the details of the rotary stylus reshaper, with certain parts broken away for clarity.
Figure 4A:
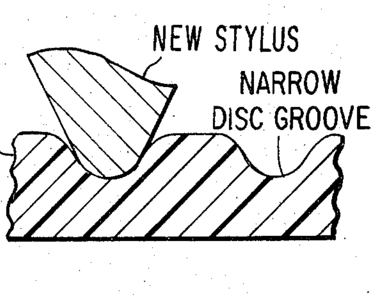
Figure 4B:
Figure 5A:
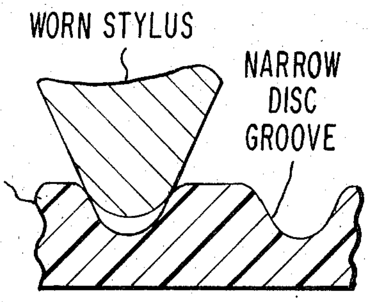
Figure 5B:
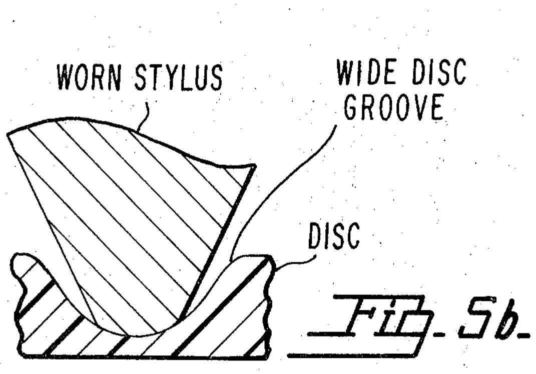
Figure 6A:
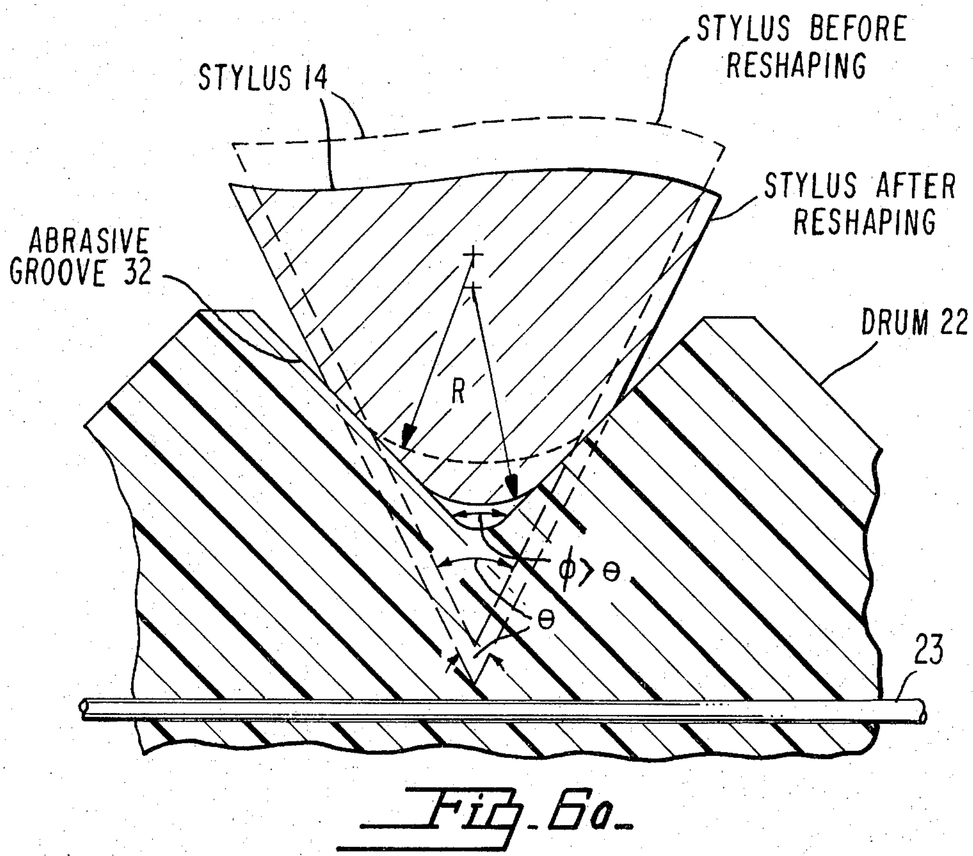
Figure 6B:
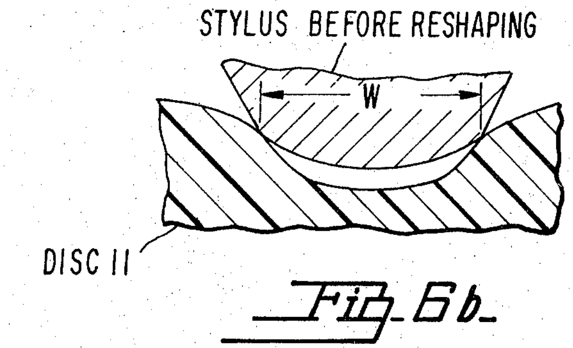
Figure 6C:
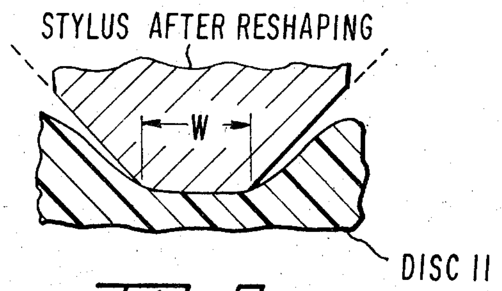

FIGS. 4*a* and 4*b* illustrate a sectional view of a relatively new stylus riding, respectively, in a comparatively narrow groove and a comparatively wide groove;

FIGS. 5*a* and 5*b* illustrate a sectional view of a relatively worn stylus riding, respectively, in a comparatively narrow groove and a comparatively wide groove;

FIG. 6*a* illustrates a particular example of geometry of an abrasive groove suitable for use with rotary stylus reshaper of FIGS. 1, 2, and 3;

FIGS. 6*b* and 6*c* illustrate sectional views of a stylus-groove engagement, before reshaping and after reshaping of the stylus, respectively, the reshaping having been done in an abrasive groove of the type illustrated in FIG. 6*a*.

DESCRIPTION OF THE INVENTION

FIG. 1 illustrates a portion of a player comprising a motorboard 10 having a turntable 11 rotatably secured thereon. The player is suitable for use in a video disc system such as disclosed in the aforementioned copending Clemens' application (U.S. Pat. Application, Ser. No. 126,772). The surface of the turntable 11 is adapted to support a disc 12. A motor and a suitable engaging mechanism (not shown) drives the turntable 11 at a predetermined speed when the player is operative. The rotational motion of the turntable 11 is transmitted to the disc 12 via mutual frictional contact. Video information is contained in geometric variations in the bottom of a smooth spiral groove 13 of the disc 12. The disc surface includes a layer of conductive material which is preferably covered with a thin coating of dielectric material. A stylus 14, subject to positioning in the disc groove 13 includes a conductive surface which, together with the conductive material and dielectric coating of the disc, form a capacitor. When relative motion is established between the stylus 14 and the disc 12, an edge of the conductive surface included in the stylus, while riding in the disc groove 13, serves as an electrode of a capacitor varying due to the geometric variations in the bottom of the spiral groove passing beneath. The varying capacitance is coupled via the conductive surface of the stylus 14 and a stylus arm 15 to suitable signal processing means which convert the capacitance variations to electrical signal variations representative of the recorded video information. The signal output of the signal processing means may be applied to a conventional television receiver to effect image reproduction.

The other end of the stylus-arm 15 is permanently inserted into a stylus arm holder 16. The stylus arm holder 16 is flexibly coupled to a stylus arm carrying mechanism by a spring loaded pivot coupling (described later). The stylus arm carrying mechanism comprises a velocity adjusting system 17 mounted on a suitable feed drive system. The feed drive system primarily performs the following functions: (a) a lateral movement of the stylus transversely across the disc in proper time relationship with the rotational speed of the disc during disc play, which positive lateral movement of the stylus is desirable as the fragile walls of relatively narrow grooves of the video disc cannot be dependably relied upon to pull the stylus arm assembly around the pivot across the entire recorded surface of the disc; and (b) the programmed movements of the stylus between a rest position and a play position, upon play initiation, and in a return to the rest position, upon play termination.

Illustratively, velocity adjusting system 17 may be of the type disclosed in U.S. Pat. No. 3,711,641, issued to R. C. Palmer on Jan. 16, 1973, entitled "Velocity Adjusting System." In the Palmer system, the cyclical speed errors in the relative speed between the disc 12 and the stylus 14 are compensated by varying the position of the stylus in relation to the disc. Circuit means provide an error signal representative of deviation of the instantaneous speed from the predetermined speed. Transducer means, responsive to the error signal, impart motion to the stylus arm pivot coupling in a direction tangential to the groove at the point of engagement in a manner that minimizes the speed error.

A box-like shield enclosure 18, attached to the velocity adjusting system 17, houses the stylus arm assembly. The stylus-arm 15 protrudes through an aperture 19 in the bottom of the shield enclosure 18 permitting the stylus 14 to ride in the disc groove 13 of the disc 12. In the inoperative position, a pivotally mounted stylus arm centering ramp 20 sustains the free end of the stylus-arm 15. As the stylus-arm 15 is lifted out of groove engagement by the centering ramp 20, which may be manually or automatically actuated, the V-shaped slot 21 provided in the centering ramp permits the stylus-arm to gravitate to the center of the ramp. As the stylus-arm 15 is lowered for playback, the V-shaped slot 21 causes the stylus 14 to descend substantially centrally for smooth engagement with the spiral groove 13 in a manner that minimizes the likelihood of misalignment. It is noted that in the operative position (playback or shaping) the centering ramp 20 is out of contact with the stylus-arm 15 to permit free pivotal movement of the stylus-arm. Reference may be made to the copending application of Frederick R. Stave, Ser. No. 351,600, filed Apr. 16, 1973, and entitled "Video Disc Playback Apparatus," for examples of apparatus which may be employed to effect the ramp actuation and stylus housing drive functions in the above-described player operations.

A roatable drum 22 having an axle of rotation 23 perpendicular to the longitudinal axis of the stylus-arm 15, is located under the stylus when in the rest position. The drum has plurality of appropriately shaped, circular and coaxial, abrasive grooves 32, concentric with the drum, for the purpose of reshaping the stylus to the desired shape. The reason behind having a plurality of circular grooves instead of a single spiral groove is to avoid a lateral movement of the stylus (perpendicular to the stylus-arm) during reshaping and thereby changing the attitude of the conductive surface in relation to the abrasive groove of the drum which is undesirable. The reason for having a plurality of grooves instead of a single groove is to assure engagement of the stylus in an abrasive groove as the stylus is lowered for reshaping regardless of small random variations in the position at which the stylus comes to rest at the end of playback sequence. The drum may conveniently be made of an abrasive loaded plastic material which is molded into proper configuration. The axle 23 is supported on bearings 24 and 25 secured to the motorboard 10. A friction wheel 26 mounted on the axle 23 engages the turntable 11 and causes rotation of the drum 22. A deactivating means may be proviced for decoupling the friction wheel 26 from the turntable 11 when the reshaping means is not in operation. A cleaning brush 33 having its bristles in contact with the drum 22, is secured to the board beneath the drum for the purpose of automatically cleaning the drum during drum rotation.

FIGS. 2 and 3 illustrate an end view and an elevation of the rotary stylus reshaper. The spring loaded pivot coupling 27 comprises a plug 28 inserted at one end permanently in the stylus arm holder 16. The plug 28 is received at the other end in a "closed-ended" opening disposed in a support member 29. The support member 29 is attached to the movable member of the velocity adjusting system 17. A spring member 30 coupled to the plug 28 and the support member 29 continuously urges the plug and the stylus-arm 15 (carrying the stylus) toward the disc in play position and toward the drum in the shaping position. The moment exerted by the spring member 30 on the stylus-arm 15, is balanced by an equal and opposite moment exerted by (1) the disc 12 when in the play position, (2) by the drum while in the reshaping position (3) and by the ramp 20 when the player is inoperative. As illustrated in FIG. 2, the stylus-arm 15, both in the operative and inoperative position, inclines (illustratively, subtends an angle of approximately 7° to 10°) towards the surface of the disc 12. The illustrated direction of rotation of the drum is such as to produce tension in the stylus-arm 15. This is desired because, if the direction of rotation of the drum 22 were such as to cause compression in the stylus-arm 15, and if the stylus 14 were caught in an abrasive groove on the drum, then the stylus-arm would have a tendency to dig into the drum with possibility of permanent damage to the delicate stylus arm assembly. However, with the direction of rotation of the drum 22 as indicated in FIG. 2, catching of the stylus 14 in the abrasive grooves of the drum simply causes the stylus arm to be lifted out of the opening in the support member 29.

FIGS. 4*a* and 4*b* illustrate a sectional view of a relatively new stylus riding, respectively, in a comparatively narrow groove and a comparatively wide groove. Due to mass production techniques, the grooves stamped on the disc may undesirably vary in geometry, in spite of an attempt to control various operating conditions. As can be seen in FIGS. 4*a* and 4*b*, the variation in the width of the disc grooves does not normally prevent smooth engagement between a new stylus tip and the bottom of the disc grooves. FIGS. 5*a* and 5*b* illustrate a sectional view of a relatively worn stylus riding, respectively, in a comparatively narrow groove and a comparatively wide groove. As shown, a comparatively narrow groove lifts the stylus out of engagement from the information carrying bottom of the disc groove, tending to cause the signal to drop-out. The rotary stylus reshaper substantially eliminates such problems.

As indicated before, for accurate reproduction of prerecorded signals, it is desirable that engagement of mating surfaces of the stylus tip and the disc groove bottom be obtaining during playback, in spite of manufacturing variations in the geometry of the disc groove. A particular example of use of the invention to ensure achievement of the desired engagement is illustrated in FIGS. 6*a* through 6*c*.

In FIG. 6*a*, the stylus is shown (in dotted outline) lowered for reshaping into an abrasive groove 32 on the drum 22, mounted for rotation on the axle 23. The outside edges of the stylus, when extended, subtend an angele $\theta$. The surface of the stylus which engages the groove 13 in the disc 11 has a radius R. The width of the stylus is the dimension between the two points at which the outside edges of the stylus intersect the mating surface with radius R. For accurate reproduction, it is desirable to maintain this dimension within tolerance (e.g., 2.0 to 2.5 microns). The faces of the V-shaped abrasive groove 32 subtend an angle $\phi$. The $\phi$, in this particular example, is made greater than the angle $\theta$ so that when the worn stylus is lowered into an abrasive groove, initial contact with the abrasive groove will be made substantially along the two lines at which the outside edges of the stylus intersect the mating surface with radius R. The distance between the above two lines is the crucial width dimension of the stylus which needs to be maintained within predetermined tolerance limits. This relationship between the angles $\phi$ to $\theta$ ($\phi > \theta$) is desirable to minimize the reshaping time, which is the time required to reduce the width of the stylus to an acceptable value (e.g., 2 microns). The reduce-width stylus shape, attained by the reshaping, is shown by the solid line stylus outline in FIG. 6*a*.

FIGS. 6*b* and 6*c* illustrate a stylus-groove engagement, before reshaping and after reshaping of the stylus, respectively. It is noted that the reshaping operation substantially restores the desired attainment of engagement between mating surfaces of the stylus tip and the disc groove bottom.

It should be noted that the above discussed groove fitting problem is not the only problem attending wear of the video disc stylus. For example, a deterioration of signal-to-noise ratio may be encountered when the stylus wears to a width greater than the width of the information track in the groove bottom. It may thus be desirable to use the reshaping approach of the present invention to overcome such deterioration even though wear has not progressed to the point where proper seating of the stylus in a groove is disturbed. To ensure optimum timing and controlled duration of reshaper use, automatic initiation of the reshaping cycle, e.g., upon each return to the rest position, may be preferable to manual initiation at the user's option. A convenient way to limit the drum rotation period, in such automation operation, is to provide coupling of drive from the turntable to the abrasive drum only during the turntable rundown accompanying player shutdown.

Illustratively, the chronology of events in use of the reshaper is as follows. The feed drive mechanism brings the stylus 14 to the rest position at the end of a playback sequence. The centering ramp, which may be manually or automatically actuated (e.g., by apparatus of the aforementioned Stave type), lowers the stylus into an abrasive groove 32 on the rotating drum 22. The circular and coaxial groove configuration on the drum facilitates a constant attitude of the stylus 14 with respect to the groove 32 during drum rotation, and the inclusion of a plurality of the grooves assures one groove in substantial alignment with the stylus regardless of random variations in the stylus rest position. When the stylus 14 is being shaped by the abrasive groove 32, the centering ramp 20 is out of engagement with the stylus-arm 15, and therefore the spring 30 urges the stylus toward the drum, thereby providing appropriate pressure between the mating surfaces. After a predetermined interval of time, the stylus 14 is raised by the centering ramp 20 to its rest position.

Thus, a rotary stylus shaper, according to the principles of this invention, is simple and inexpensive in construction and well-suited for on-site reshaping of a video disc stylus, for the purpose of prolonging the useful life of the stylus.

What is claimed is:

1. In a disc playback system including a board, a turntable mounted for rotation relative to said board, and having a surface adapted to receive a disc having a spiral groove with information recorded therein, a stylus having a tip subject to placement in said disc groove for recovering said information while in a play position, and a stylus-arm carrying said stylus, said stylus-arm being mounted with respect to said board in a manner permitting movement of said stylus between rest and play positions; a rotary stylus reshaper comprising;

a rotatable drum having an axis of rotation perpendicular to the longitudinal axis of the stylus arm mounted on said board and located under said stylus when said stylus is at the rest position, said drum having a plurality of abrasive, coaxial, substantially V-shaped grooves, concentric with said drum, said V-shaped grooves having opening dimensions greater than the width dimension of said stylus tip;

a drive means secured to said board and coupled to said drum for causing rotation of said drum for the purpose of reshaping said stylus; and means for lowering and raising of said stylus tip into and out of engagement with an abrasive groove on said drum when said stylus is at the rest position.

2. A system as defined in claim 1 wherein the faces of said V-shaped grooves subtend an angle greater than the angle included between the side edges of said stylus tip.

3. A system as defined in claim 1 wherein said drive means for rotating said drum includes a wheel frictionally driven by said turntable.

4. A system as defined in claim 3 wherein the coupling between said drum and said drive means is a common axle carrying said wheel and said drum.

5. A system as defined in claim 1 wherein said drum is molded of an abrasive-loaded plastic material.

6. A system as defined in claim 1 further including a cleaning brush secured to said board having its bristles in contact with said drum for the purpose of cleaning said drum during drum rotation.

7. A system as defined in claim 1 wherein said means for lowering and raising of said stylus tip into and out of engagement with an abrasive groove on said drum is activated following each movement of said stylus from a play position to said rest position.

* * * * *